(12) United States Patent
Reed et al.

(10) Patent No.: US 10,495,493 B2
(45) Date of Patent: Dec. 3, 2019

(54) SYSTEMS AND METHODS FOR CONTROLLING SENSING DEVICE FIELD OF VIEW

(71) Applicant: GM GLOBAL TECHNOLOGY OPERATIONS LLC, Detroit, MI (US)

(72) Inventors: Brooks Reed, San Francisco, CA (US); Yung-Chang Ko, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 15/635,352

(22) Filed: Jun. 28, 2017

(65) Prior Publication Data
US 2019/0003862 A1    Jan. 3, 2019

(51) Int. Cl.
*G01D 11/30* (2006.01)
*B60R 11/04* (2006.01)

(52) U.S. Cl.
CPC .............. *G01D 11/30* (2013.01); *B60R 11/04* (2013.01)

(58) Field of Classification Search
CPC . G08G 1/00; G08G 1/04; G01C 21/00; G01C 21/005; G01C 21/16; G01C 21/12; G01C 21/34; G01C 21/3415; G01C 21/3626; G01C 21/2635; G01C 21/3664; G01C 21/3667; G01C 21/367; G01C 21/3682; G01C 1/00; G01C 3/00; G01C 3/30; G01C 5/00; B60R 1/00; B60R 1/06; B60R 2300/00; B60R 11/04; G01S 2013/86; G01S 2013/931; G01S 2013/9353; G01S 2013/936; G01S 2013/9364; G01S 2013/9367; G01S 17/936; G01S 7/4026; G01S 15/931; G01D 11/30
See application file for complete search history.

(56) References Cited

U.S. PATENT DOCUMENTS

| | | | | |
|---|---|---|---|---|
| 7,313,467 | B2* | 12/2007 | Breed | ............... G07C 5/008 |
| | | | | 307/9.1 |
| 9,193,303 | B2* | 11/2015 | Higgins-Luthman | ..... B60R 1/00 |
| 2006/0089764 | A1* | 4/2006 | Filippov | ............... G05D 1/027 |
| | | | | 701/23 |
| 2018/0003529 | A1 | 1/2018 | Ko | |
| 2018/0307236 | A1 | 10/2018 | Reed | |

\* cited by examiner

*Primary Examiner* — Anthony R Jimenez
(74) *Attorney, Agent, or Firm* — Lorenz & Kopf, LLP

(57) ABSTRACT

Systems and method are provided for controlling a vehicle. In one embodiment, a method includes: receiving a current position of the vehicle along a determined path; retrieving map information that includes a pitch and a curvature of a roadway at or near the current position; determining, based on the map information, a planned pitch and a planned roll of the vehicle at or near the current position; determining, based on the planned pitch and the planned roll, a location of the field of view of the sensing device; determining, based on the location of the field of view and a location of an area of interest, an amount of movement of the sensing device to align the field of view with the area of interest; and generating, one or more control signals to one or more actuators associated with the sensing device based on the determined amount of movement.

20 Claims, 8 Drawing Sheets

SYSTEMS AND METHODS FOR CONTROLLING SENSING DEVICE FIELD OF VIEW

TECHNICAL FIELD

The present disclosure generally relates to autonomous vehicles, and more particularly relates to systems and methods for controlling a field of view of a sensing device based on a planned path and a real-time movement of the vehicle.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Generally, the sensing devices associated with the autonomous vehicle have a field of view. The sensing device is capable of sensing the environment observed in its field of view. During the operation of the autonomous vehicle, a position of the sensing device may be controlled such that the field of view is aligned with an area of interest. In certain instances, however, due to terrain (e.g. hills), unexpected road conditions (e.g. potholes), the field of view of the sensing device may not align with the area of interest.

Accordingly, it is desirable to provide systems and methods that control a field of view of a sensing device based on a planned path and a real-time movement of the vehicle such that the field of view of the sensing device maintains alignment with the area of interest. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for controlling a field of view of a sensing device of an autonomous vehicle. In one embodiment, a method includes: receiving a current position of the autonomous vehicle along a determined path; retrieving map information that includes a pitch and a curvature of a roadway at or near the current position; determining, by a processor, based on the map information, a planned pitch of the autonomous vehicle at or near the current position; determining, by the processor, based on the map information, a planned roll of the autonomous vehicle at or near the current position; determining, by the processor, based on the planned pitch and the planned roll of the autonomous vehicle, a location of the field of view of the sensing device; determining, based on the location of the field of view and a location of an area of interest at the current position, an amount of movement of the sensing device to align the field of view with the area of interest; and generating, by the processor, one or more control signals to one or more actuators associated with the sensing device to move the sensing device to align the field of view based on the determined amount of movement.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
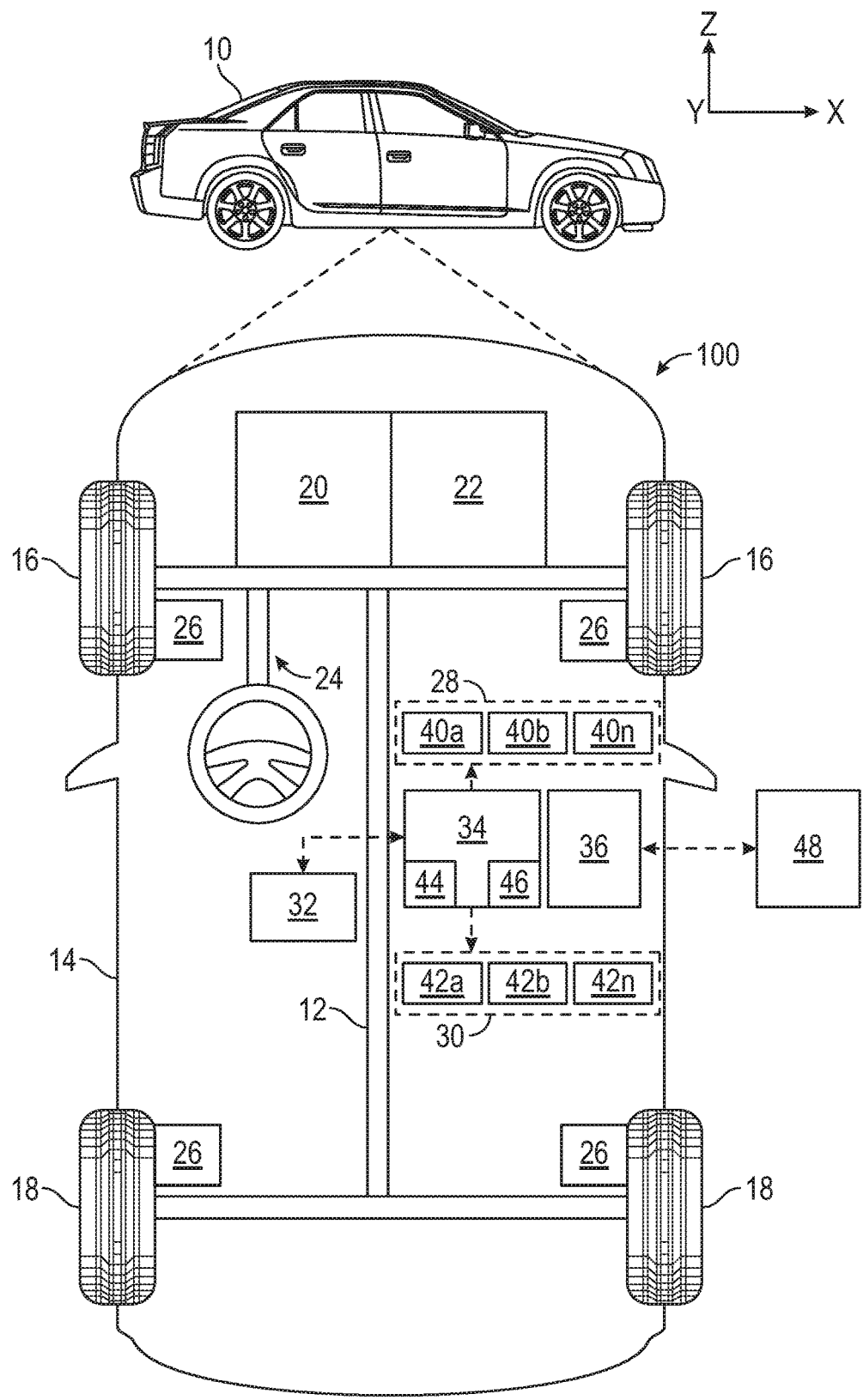
FIG. 1 is a functional block diagram illustrating an autonomous vehicle having a sensing device field of view control system, in accordance with various embodiments.

With reference to FIG. 1, a sensing device field of view control system shown generally at 100 is associated with a vehicle 10 in accordance with various embodiments. In general, the sensing device field of view control system 100 maintains a field of view of a sensing device associated with the vehicle 10 in alignment with an area of interest during a pitch and/or a roll of the vehicle 10 and intelligently controls a positon of the sensing device based thereon. By intelligently controlling the position of the sensing device during a pitch and/or roll of the vehicle 10, a sensing device may be employed that has a narrow field of view.

As depicted in FIG. 1, the vehicle 10 generally includes a chassis 12, a body 14, front wheels 16, and rear wheels 18. The vehicle 10 has a vehicle coordinate system, which is a frame of reference for determining a location of an object on the vehicle 10. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14.

In various embodiments, the vehicle 10 is an autonomous vehicle and the sensing device field of view control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

Figure 1A:
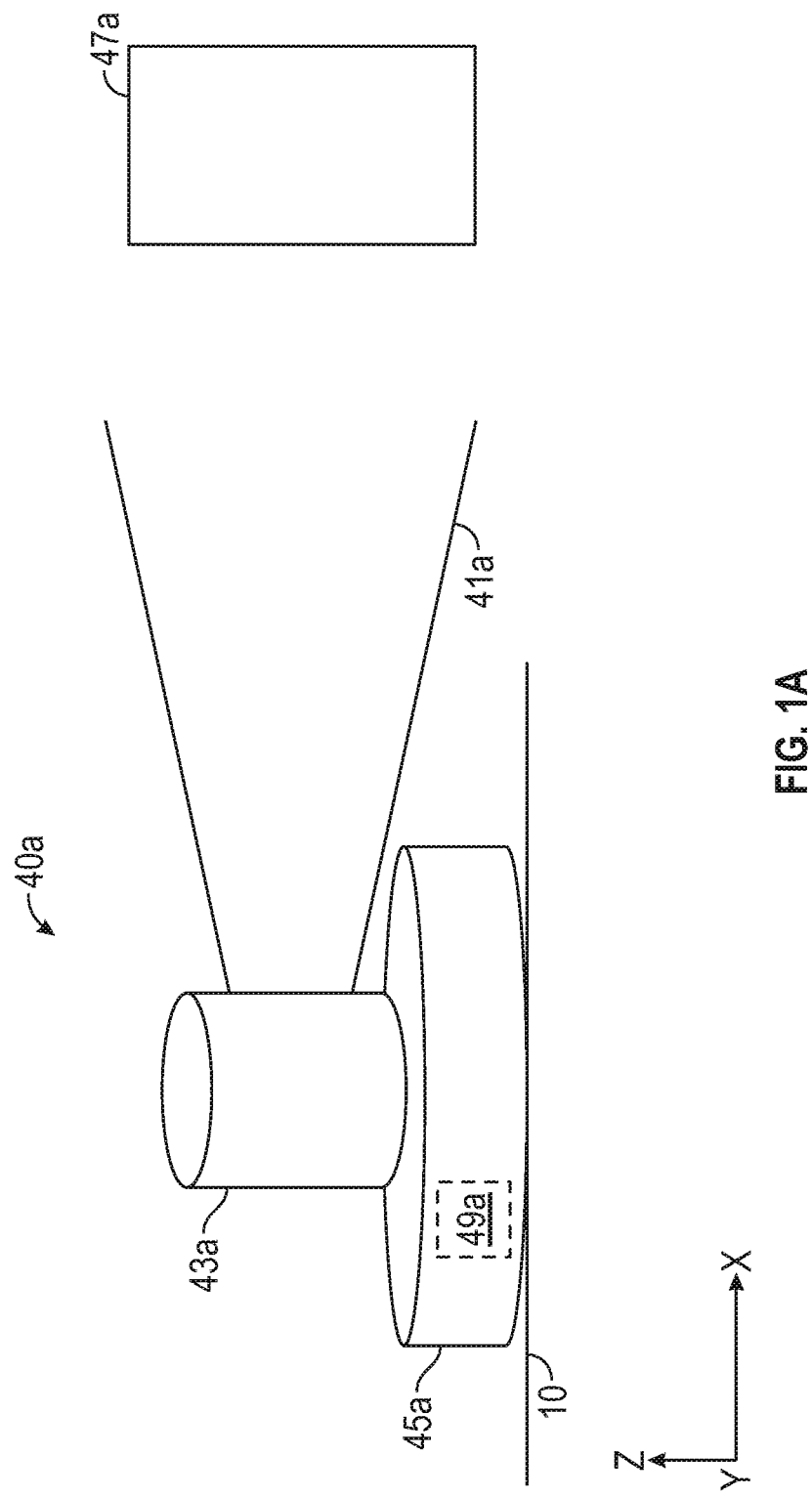
FIG. 1A is a schematic illustration of a sensing device for the autonomous vehicle of FIG. 1, which has a field of view that is controlled by the sensing device field of view control system of FIG. 1.

The sensor system 28 includes one or more sensing devices 40a-40n that each include a field of view for sensing observable conditions of the exterior environment and/or the interior environment of the autonomous vehicle 10. The sensing devices 40a-40n can include, but are not limited to, radars, lidars, optical cameras, thermal cameras, ultrasonic sensors, and/or other sensors. In addition, one or more of the sensing devices 40a-40n may comprise chassis sensing devices, which observe a movement of the chassis 12, such as a pitch or a roll of the chassis 12, and generate sensor signals based thereon. Thus, one or more of the sensing devices 40a-40n may comprise an inertial measurement unit (IMU) that observes the pitch and the roll of the chassis 12. In addition, one or more of the sensing devices 40a-40n is movable in two degrees of freedom. For example, with reference to FIG. 1A, a schematic illustration of the sensing device 40a is shown. It will be understood that one or more of the remaining sensing devices 40b-40n may the same as or substantially similar to the sensing device 40a, and for the ease of description, a single one of the sensing devices 40a-40n will be discussed herein. In this example, the sensing device 40a has a sensor 43a with a 360 degree field of view 41a (a portion of which is shown in FIG. 1A). The sensing device 40a is movable about a first axis or X-axis (roll) and a second or Y-axis (pitch) based on one or more control signals received from the controller 34. In this example, the sensing device 40a includes the sensor 43a and a sensor platform 45a. The sensor 43a observes the exterior environment and/or the interior environment of the autonomous vehicle 10 and generates sensor signals based thereon. The sensor 43a includes, but is not limited to, radars, lidars, optical cameras, thermal cameras, ultrasonic sensors, and/or other sensors.

The sensor platform 45a is responsive to the one or more control signals to move the sensor 43a such that the field of view 41a of the sensor 43a is aligned with an area of interest 47a. In this example, the area of interest 47a is a portion of a roadway associated with the planned path of the autonomous vehicle 10. As the sensor platform 45a is coupled to a portion of the autonomous vehicle 10, a movement of the autonomous vehicle 10 in pitch (Y-axis) and/or roll (X-axis) results in a corresponding movement of the sensing device 40a. Thus, in certain instances, such as during a descent down a hill or a climb up a hill, the sensor 43a of the sensing device 40a may not be aligned with the area of interest 47a. In this regard, during a descent down a hill, the sensor 43a of the sensing device 40a may be need to be orientated upward (rotated about the Y-axis) to capture the area of interest 47a, while during a climb of a hill, the sensor 43a may need to be orientated downward (rotated about the Y-axis) to capture the area of interest 47a. As a further example, during a cornering maneuver, the sensor 43a may need to be rotated about the X-axis to capture the area of interest 47a. The sensor platform 45a includes one or more actuators 49a, which are responsive to the one or more control signals from the controller 34 to move the sensor 43a about the Y-axis (pitch) and/or the X-axis (roll). In various embodiments, the sensor platform 45a is the sensor platform system 100 of U.S. patent application Ser. No. 15/197,654, filed on Jun. 29, 2016, titled "SYSTEMS AND METHODS FOR SENSOR PLATFORM" to co-inventor Yung-Chang Ko, the relevant portion of which is incorporated herein by reference in its entirety. In other embodiments, the sensor platform 45a includes one or more gimbal platforms having one or more actuators that are responsive to the one or more control signals from the controller 34 to move the sensor 43a about the Y-axis (pitch) and/or the X-axis (roll).

With reference back to FIG. 1, the actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
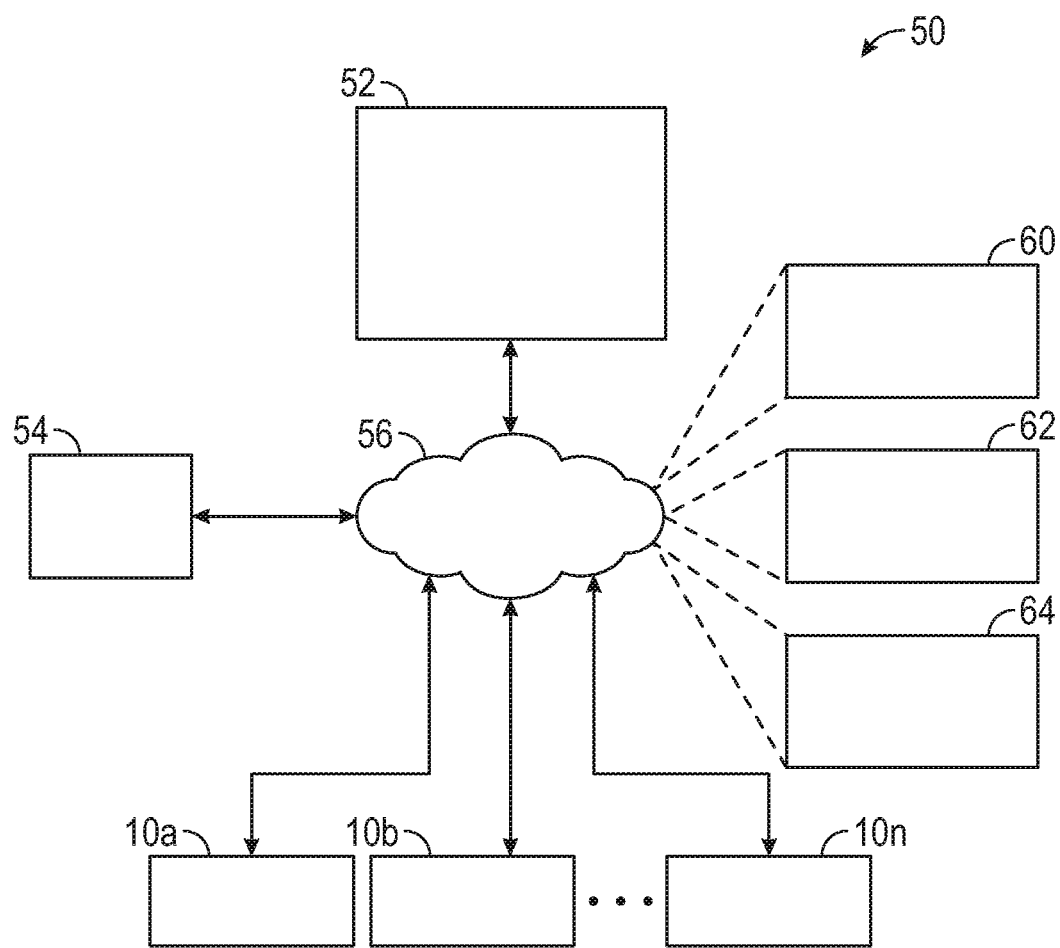
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the sensing device field of view control system 100 and, when executed by the processor 44, cause the processor 44 to calculate, determine or generate one or more control signals for the actuators 49a-49n to move the sensing devices 40a-40n to a position that maintains an alignment of the field of view 41a-41n of the sensor 43a-43n during pitch and/or roll of the autonomous vehicle 10. For example, as described in greater detail below in the context of FIGS. 4-7, the instructions may cause the processor 44 to obtain, either from the at least one data storage device 32 or another entity 48 (e.g., a networked map database), elevation, pitch and/or curvature data for the planned path in front of and at the current vehicle position, and then utilize the elevation, pitch and/or curvature data to derive the position for the one or more of the sensing devices 40a-40n such that the field of view 41a-41n of the sensing devices 40a-40n is aligned with the area of interest 47a-47n during the pitch and/or roll of the autonomous vehicle 10.

In various embodiments, the processor 44 obtains data or information that characterizes the field of view 41a-41n of one or more onboard sensing devices 40a-40n, and using the elevation changes and roadway pitch at or near the current location of the vehicle 10 along with an observed pitch of the chassis 12 of the vehicle 10, the processor 44 determines a movement for one or more respective sensing devices 40a-40n to maintain the field of view 41a-41n aligned with the area of interest 47a-47n based on the relationship between the field of view 41a-41n and the pitch of the chassis 12. Thus, when the roadway pitch and elevation changes alter the alignment of the field of view 41a-41n with the area of interest 47a-47n at a particular location, the position of the respective one or more of the sensing devices 40a-40n is controlled in a corresponding manner to maintain the field of view 41a-41n of the sensor 43a-43n of the sensing device 40a-40n aligned with the area of interest 47a-47n at that location. This may, for example, cause the one or more sensing devices 40a-40n to be rotated relative to the Y-axis at the crest or trough of a relatively steep hill.

In various embodiments, the processor 44 obtains data or information that characterizes the field of view 41a-41n of one or more onboard sensing devices 40a-40n, and using the curvature of the roadway at or near the current location of the vehicle 10 along with an observed roll of the chassis 12 of the vehicle 10, the processor 44 determines a movement for one or more respective sensing devices 40a-40n to maintain the field of view 41a-41n aligned with the area of interest 47a-47n based on the relationship between the field of view 41a-41n and the roll of the chassis 12. Thus, when the roadway curvature changes alter the alignment of the field of view 41a-41n with the area of interest 47a-47n at a particular location, the position of the respective one or more of the sensing devices 40a-40n is controlled in a corresponding manner to maintain the field of view 41a-41n of the sensor 43a-43n of the sensing device 40a-40n aligned with the area of interest 47a-47n at that location. This may, for example, cause the one or more sensing devices 40a-40n to be rotated relative to the X-axis during a cornering maneuver of the autonomous vehicle 10.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
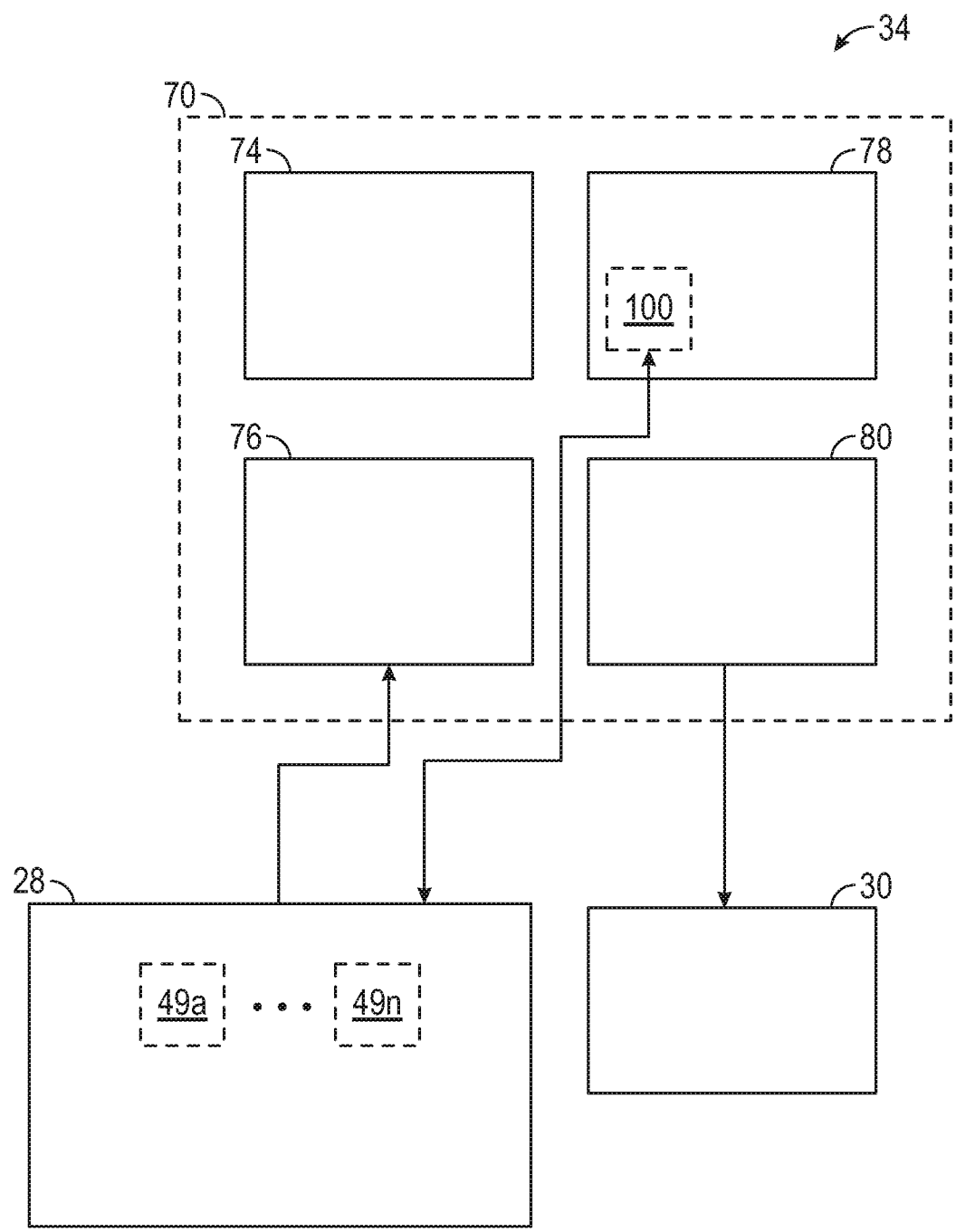
FIGS. 3 and 4 are dataflow diagrams illustrating an autonomous driving system that includes the sensing device field of view control system of the autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the sensing device field of view control system 100 of FIG. 1 is included within the autonomous driving system 70, and for example, is embedded within or associated with the guidance system 78. In this example, the sensing device field of view control system 100 receives the position of the vehicle 10 from the positioning system 76, sensor signals from the sensor system 28 and receives the determined path from the guidance system 78. Based on the position of the vehicle 10, the sensor signals from the sensor system 28 and the determined path for the vehicle 10, the sensing device field of view control system 100 determines the position for the sensors 43a-43n of the sensing devices 40a-40n to maintain the field of view 41a-41n aligned with the area of interest 47a-47n as the vehicle 10 moves along the determined path. In this regard, the sensing device field of view control system 100 outputs one or more control signals to the actuators 49a-49n of the sensing devices 40a-40n to move the sensors 43a-43n of the sensing devices 40a-40n to a position that maintains the alignment of the field of view 41a-41n with the area of interest 47a-47n. Generally, the sensing device field of view control system 100 outputs one or more control signals to the actuators 49a-49n of the sensing devices 40a-40n based on inputs received from other modules of the vehicle 10 and based on the control systems and methods of the present disclosure.

Figure 4:
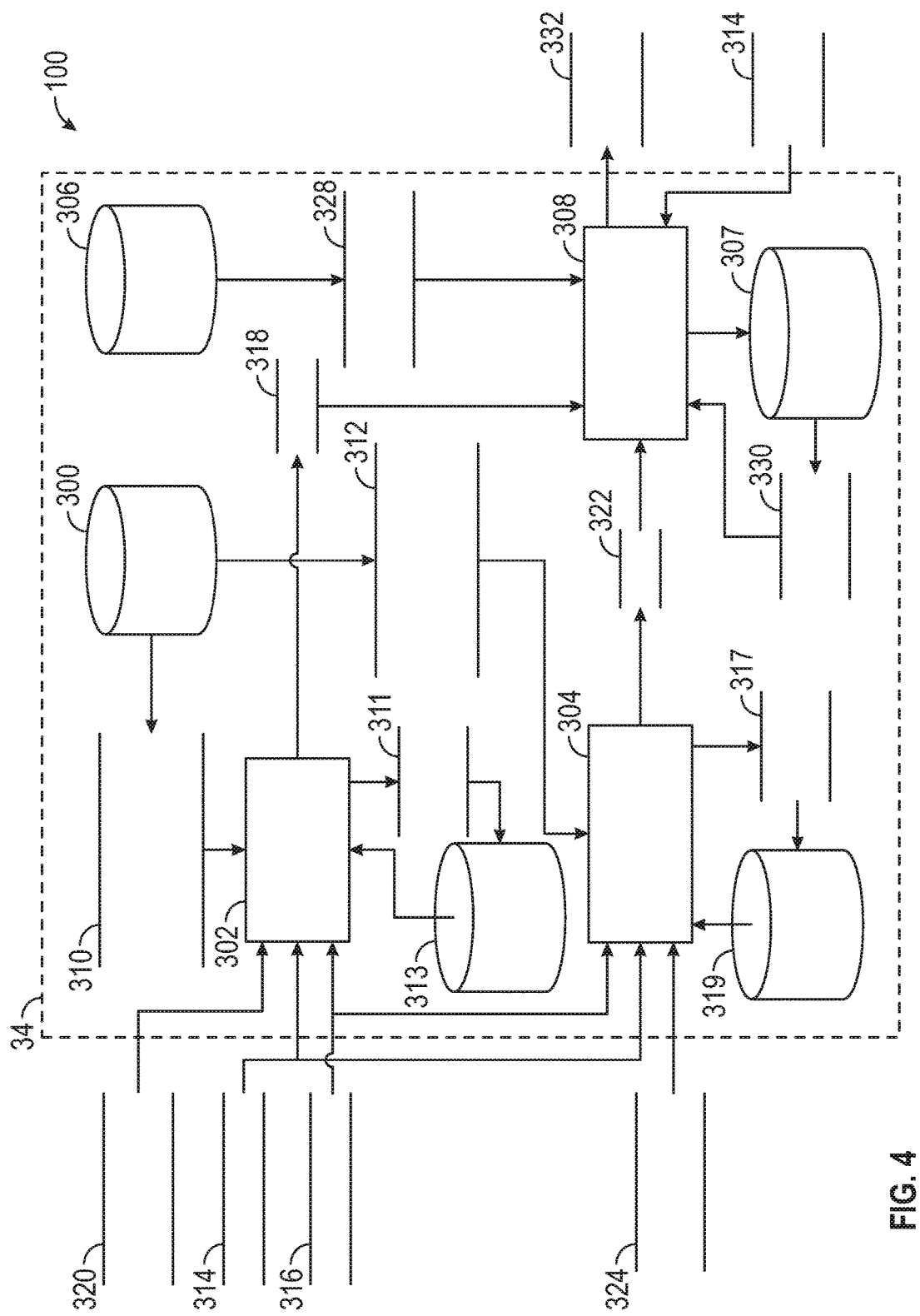

For example, as shown in more detail with regard to FIG. 4 and with continued reference to FIG. 3, a dataflow diagram illustrates various embodiments of the sensing device field of view control system 100 for the sensing devices 40a-40n, which may be embedded within the controller 34. Various embodiments of the sensing device field of view control system 100 according to the present disclosure can include any number of sub-modules embedded within the controller 34. As can be appreciated, the sub-modules shown in FIG. 4 can be combined and/or further partitioned to similarly control the one or more actuators 49a-49n. Inputs to the sensing device field of view control system 100 may be received from the positioning system 76 (FIG. 3), received from the guidance system 78 (FIG. 3), received from the sensor system 28 (FIG. 1), received from other control modules (not shown) associated with the vehicle 10, and/or determined/modeled by other sub-modules (not shown) within the controller 34. In various embodiments, the sensing device field of view control system 100 includes a map datastore 300, a pitch compensation module 302, a pitch datastore 313, a roll compensation module 304, a roll datastore 319, a sensor datastore 306, an interest data datastore 307 and a sensor control module 308.

The map datastore 300 stores map information 310 of known roadway pitch and/or inclines and map information of known roadway curvature 312. The map information 310 includes maps of various areas and indications of locations within the map of known roadway pitch and/or inclines. The roadway pitch and/or incline is predefined (e.g., defined by a user of the remote transportation system 52 and communicated to the vehicle 10) and/or learned over time (e.g., learned based on repeated input from the one or more sensing devices 40a-40n, or other method of learning) by the vehicle 10 or other vehicles 10a-10n. The map information 312 includes maps of various areas and indications of locations within the map of known roadway curvatures. The roadway curvature is predefined (e.g., defined by a user of the remote transportation system 52 and communicated to the vehicle 10) and/or learned over time (e.g., learned based on repeated input from the one or more sensing devices 40a-40n, or other method of learning) by the vehicle 10 or other vehicles 10a-10n.

The pitch datastore 313 stores data of the determined planned pitch of the vehicle 10 over a longitudinal prediction horizon associated with a geographical coordinate location of the vehicle 10. The pitch datastore 313 is populated by the pitch compensation module 302 during the travel of the vehicle 10 along the planned path.

The pitch compensation module 302 receives as input position data 314. The position data 314 is the current position of the vehicle 10, which includes a local position relative to a map, an exact position relative to lane of a road, vehicle heading, velocity, etc. In various embodiments, the position data 314 is received from the positioning system 76 and is provided in a geographical or world coordinate system. The pitch compensation module 302 also receives as input path data 316. The path data 316 is the planned or determined path for the vehicle 10, as determined by the guidance system 78, which may include geographical coordinate locations for the vehicle 10 to arrive at a destination. The path data 316 may include, for example, information about the route the vehicle 10 is traveling along to reach a destination from the current position, including current and future lane information (e.g., lane types, boundaries, and other constraints or restrictions).

Based on the current position of the vehicle 10 and the determined path, the pitch compensation module 302 retrieves the map information 310 from the map datastore 300. The pitch compensation module 302 may also retrieve the map information 310 that encompasses some additional forward travel distance into the future near the current position of the vehicle 10 (based on the determined path), which may be considered a longitudinal prediction horizon. The map information 310 may include surveyed elevation or pitch data along the roadway on which the vehicle 10 is traveling at locations corresponding to the geographical coordinate locations defined in the path data 316. In other embodiments, the map information 310 includes lower resolution surveyed elevation or pitch data along the roadway on which the vehicle 10 is traveling at relatively fewer locations, which, in turn is interpolated or extrapolated to obtain elevation and pitch data for the current position of the vehicle 10 and/or at geographical coordinate locations associated with the path data 316. In other yet embodiments, the map information 310 may include surveyed elevation data for a geographic region that is independent of roadways, which, in turn, is interpolated or extrapolated to obtain estimated elevation data for the current position of the vehicle 10 and/or at geographical coordinate locations associated with the path data 316 from which roadway pitch can be calculated or otherwise determined.

In addition, it should be noted that while the subject matter may be described herein primarily in the context of using a map database, mapping data, survey data, or the like to obtain roadway pitch data corresponding to the current position of the vehicle 10 and/or future locations along the planned route of a vehicle, the subject matter described herein is not necessarily limited to mapped pitch data. For example, in various embodiments, future roadway pitch data may be obtained from or otherwise determined in realtime using one or more sensing devices 40a-40n onboard the vehicle 10, such as, for example, cameras or other imaging sensors, radar, lidar, or other ranging devices, inertial measurement units (IMUs) or other inertial sensors onboard the vehicle 10, and the like. Additionally, in various embodiments, future roadway pitch data may be calculated or determined by blending, fusing, or otherwise augmenting pitch data derived from mapping data with sensed pitch data determined using onboard sensing devices 40a-40n. Accordingly, the subject matter described herein is not intended to be limited to any particular source of roadway pitch data for future locations in advance of a current vehicle location along a planned route of travel.

As described above, in one or more embodiments, the pitch compensation module 302 may also retrieve or otherwise obtain roadway pitch data for a portion of a route within the longitudinal prediction horizon using the one or more onboard sensing devices 40a-40n. In this regard, if the resolution of the map database does not provide sufficient pitch data for various locations within the longitudinal prediction horizon, one or more of the onboard sensing devices 40a-40n may be utilized to calculate or otherwise determine pitch data for those locations within the longitudinal prediction horizon. For example, pitch data derived using onboard sensing devices 40a-40n may be utilized to fill gaps in the pitch data derived from the map database (e.g., by substituting sensor-derived pitch data at locations lacking map-based pitch data), or pitch data derived using onboard sensors for various locations ahead of the vehicle 10 along the route may be fused or blended with pitch data derived from the map database (e.g., by interpolating pitch data points to fill gaps within the longitudinal prediction horizon).

In one embodiment, the pitch compensation module 302 may analyze the relative qualities of the pitch data available from the different sources and select which source of pitch data to be utilized or otherwise determine the manner in which the pitch data from different sources is to be utilized. For example, in one embodiment, the pitch compensation module 302 analyzes the map-based pitch data within the longitudinal prediction horizon to determine whether the pitch data satisfies one or more quality criteria. The quality criteria, can include, for example, a resolution or accuracy criterion (e.g., a threshold level of resolution, or other criteria), a temporal criterion (e.g., map-based pitch data was obtained within some threshold time period before the current time), a reliability criterion (e.g., reliability metric associated with the source, or other criteria) and/or the like to ensure that the map-based pitch data is sufficiently reliable.

When the map-based pitch data fails to satisfy one or more quality criteria, the pitch compensation module 302 analyzes the pitch data derived from the onboard sensing devices 40a-40n or other onboard sources to identify which source should be utilized in lieu of or in addition to the map-based pitch data. For example, the pitch compensation module 302 may identify or otherwise select the sensor-based pitch data having values that meet the quality criteria and utilize the selected sensor-based pitch data in determining pitch-compensated constraints. In various embodiments, the sensor-based pitch data may be fused, blended, or otherwise combined with the map-based pitch data to achieve the required quality. For example, the map-based data may be used to fill gaps or blind spots in the sensor-based pitch data or vice versa.

In various embodiments, the pitch compensation module 302 processes the map information 310 (and/or data from other sources) and determines a planned pitch 311 of the vehicle 10 at the current position of the vehicle 10 defined in the position data 314 and a planned pitch for the vehicle 10 for a longitudinal prediction horizon based on the path data 316. In one example, based on the map information 310, the pitch compensation module 302 determines what position the chassis 12 is orientated at the current position of the vehicle 10 and for the longitudinal prediction horizon. In this example, the pitch compensation module 302 determines the planned pitch 311 for the current geographical coordinate location of the vehicle 10 in a geographical or world coordinate system and determines the planned pitch 311 for the longitudinal prediction horizon in a geographical or world coordinate system. For the current geographical coordinate location of the vehicle 10, the pitch compensation module 302 performs a coordinate transformation to translate the planned pitch 311 into the vehicle coordinate system and for the longitudinal prediction horizon, the pitch compensation module 302 performs a coordinate transformation to translate the planned pitch 311 into the vehicle coordinate system. The pitch compensation module 302 stores the planned pitch 311 for the current position of the vehicle 10 and the planned pitch 311 for the longitudinal prediction horizon associated with the respective geographical coordinate locations of the vehicle 10 in the longitudinal prediction horizon in the pitch datastore 313.

The pitch compensation module 302 also receives as input chassis pitch data 320. The chassis pitch data 320 is a substantially real-time pitch of the vehicle 10 at the current position of the vehicle 10, as observed by one or more sensing devices 40a-40n associated with the chassis 12 of the vehicle 10. For example, the chassis 12 of the vehicle 10 may pitch in an unplanned manner due to encountered characteristics of the roadway, such as bumps, potholes, etc. Generally, as the one or more sensing devices 40a-40n are coupled to the vehicle 10, the observed substantially real-time pitch of the vehicle 10 is provided in the vehicle coordinate system, which may take the force of gravity into consideration to determine the position of the chassis 12 (via an attitude estimation technique involving one of the sensing devices 40a-40n, such as an inertial measurement unit (IMU)). It should be noted that the chassis pitch data 320 may also be received from other modules associated with the vehicle 10.

Based on the chassis pitch data 320 and the position data 314, the pitch compensation module 302 queries the pitch datastore 313 and retrieves the planned pitch 311 for the current position (current geographical location) of the vehicle 10. Based on the chassis pitch data 320 and the planned pitch 311, the pitch compensation module 302 determines a pitch 318 of the vehicle 10. In one example, the pitch compensation module 302 modifies the planned pitch 311 retrieved from the pitch datastore 313 (determined from the map information 310 and/or other sources) with the substantially real-time pitch from the chassis pitch data 320 to determine the pitch 318. In one example, the pitch compensation module 302 subtracts the chassis pitch data 320 from the planned pitch 311 to determine the pitch 318. Thus, the pitch 318 is the planned and unplanned (e.g., observed by the sensing devices 40a-40n) pitch of the chassis 12 of the vehicle 10 at the current position of the vehicle 10. The pitch compensation module 302 sets the pitch 318 for the sensor control module 308. In one example, the pitch compensation module 302 may set the pitch 318 as a positive or negative rotation about the Y-axis.

The roll datastore 319 stores data of the determined planned roll of the vehicle 10 over a lateral prediction horizon associated with a geographical coordinate location of the vehicle 10. The roll datastore 319 is populated by the roll compensation module 304 during the travel of the vehicle 10 along the planned path.

The roll compensation module 304 receives as input the position data 314 and the path data 316. Based on the current position of the vehicle 10 and the determined path, the roll compensation module 304 retrieves the map information 312 from the map datastore 300. The roll compensation module 304 may also retrieve the map information 312 that encompasses some additional forward travel distance into the future near the current position of the vehicle 10 (based on the determined path), which may be considered a lateral prediction horizon. The map information 312 may include surveyed curvature data along the roadway on which the vehicle is traveling at locations corresponding to the current position of the vehicle 10 and/or at geographical coordinate locations defined in the path data 316. In other embodiments, the map information 312 includes lower resolution surveyed curvature data along the roadway on which the vehicle is traveling at relatively fewer locations, which, in turn is interpolated or extrapolated to obtain curvature data for the current position of the vehicle 10 and/or at geographical coordinate locations associated with the path data 316.

In addition, it should be noted that while the subject matter may be described herein primarily in the context of using a map database, mapping data, survey data, or the like to obtain roadway roll data corresponding to the current position of the vehicle 10 and/or future locations along the planned route of a vehicle, the subject matter described herein is not necessarily limited to mapped roll data. For example, in various embodiments, future roadway roll data may be obtained from or otherwise determined using one or more sensing devices 40a-40n onboard the vehicle, such as, for example, cameras or other imaging sensors, radar, lidar, or other ranging devices, inertial measurement units (IMUs) or other inertial sensors onboard the vehicle, and the like. Additionally, in various embodiments, future roadway roll data may be calculated or determined by blending, fusing, or otherwise augmenting roll data derived from mapping data with sensed roll data determined using onboard sensing devices 40a-40n. Accordingly, the subject matter described herein is not intended to be limited to any particular source of roadway roll data for future locations in advance of a current vehicle location along a planned route of travel.

As described above, in one or more embodiments, the roll compensation module 304 may also retrieve or otherwise obtain roadway roll data for a portion of a route within the lateral prediction horizon using the one or more onboard sensing devices 40a-40n. In this regard, if the resolution of the map database does not provide sufficient roll data for various locations within the lateral prediction horizon, the one or more onboard sensing devices 40a-40n may be utilized to calculate or otherwise determine roll data for those locations within the lateral prediction horizon. For example, roll data derived using the onboard sensing devices 40a-40n may be utilized to fill gaps in the roll data derived from the map database (e.g., by substituting sensor-derived roll data at locations lacking map-based roll data), or roll data derived using the onboard sensing devices 40a-40n for various locations ahead of the vehicle along the route may be fused or blended with roll data derived from the map database (e.g., by interpolating roll data points to fill gaps within the lateral prediction horizon).

In one embodiment, the roll compensation module 304 may analyze the relative qualities of the roll data available from the different sources and select which source of the roll data to be utilized or otherwise determine the manner in which the roll data from different sources is to be utilized. For example, in one embodiment, the roll compensation module 304 analyzes the map-based roll data within the lateral prediction horizon to determine whether the roll data satisfies one or more quality criteria. The quality criteria, can include, for example, a resolution or accuracy criterion (e.g., a threshold level of resolution, or other criteria), a temporal criterion (e.g., map-based roll data was obtained within some threshold time period before the current time), a reliability criterion (e.g., reliability metric associated with the source, or other criteria) and/or the like to ensure that the map-based roll data is sufficiently reliable.

When the map-based roll data fails to satisfy one or more quality criteria, the roll compensation module 304 analyzes the roll data derived from the onboard sensing devices 40a-40n or other onboard sources to identify which source should be utilized in lieu of or in addition to the map-based roll data. For example, the roll compensation module 304 may identify or otherwise select the sensor-based roll data having values that meet the quality criteria and utilize the selected sensor-based roll data in determining roll-compensated constraints. In various embodiments, the sensor-based roll data may be fused, blended, or otherwise combined with the map-based roll data to achieve the required quality. For example, the map-based data may be used to fill gaps or blind spots in the sensor-based roll data or vice versa.

In various embodiments, the roll compensation module 304 processes the map information 312 (or data from other sources) and determines a planned roll 317 of the vehicle 10 at the current position of the vehicle 10 defined in the position data 314 and for a lateral prediction horizon based on the path data 316. In one example, based on the map information 312 (and/or other sources), the roll compensation module 304 determines what position the chassis 12 is orientated at the current position of the vehicle 10 and determines what position the chassis 12 is orientated at over the lateral prediction horizon. In this example, the roll compensation module 304 determines the planned roll 317 for the current geographical location of the vehicle 10 in a geographical or world coordinate system and determines the planned roll 317 for the lateral prediction horizon in a geographical or world coordinate system. For the current geographical coordinate location of the vehicle 10, the roll compensation module 304 performs a coordinate transformation to translate the planned roll 317 into the vehicle coordinate system and for the lateral prediction horizon, the roll compensation module 304 performs a coordinate transformation to translate the planned roll 317 into the vehicle coordinate system. The roll compensation module 304 stores the planned roll 317 for the current position of the vehicle 10 and the planned roll 317 for the lateral prediction horizon associated with the respective geographical coordinate locations of the vehicle 10 in the lateral prediction horizon in the roll datastore 319.

The roll compensation module 304 also receives as input chassis roll data 324. The chassis roll data 324 is a substantially real-time roll of the vehicle 10 at the current position of the vehicle 10, as observed by one or more sensing devices 40a-40n associated with the chassis 12 of the vehicle 10. For example, the chassis 12 of the vehicle 10 may roll in an unplanned manner due to encountered obstacles, etc. Generally, as the one or more sensing devices 40a-40n are coupled to the vehicle 10, the observed substantially real-time roll of the vehicle 10 is provided in the vehicle coordinate system, which may take the force of gravity into consideration to determine the position of the chassis 12 (via an attitude estimation technique involving one of the sensing devices 40a-40n, such as an inertial measurement unit (IMU)). It should be noted that the chassis roll data 324 may also be received from other modules associated with the vehicle 10.

Based on the chassis roll data 324 and the position data 314, the roll compensation module 304 queries the roll datastore 319 and retrieves the planned roll 317 for the current position of the vehicle 10. Based on the chassis roll data 324 and the planned roll 317, the roll compensation module 304 determines a roll 322 of the vehicle 10. In one example, the roll compensation module 304 modifies the planned roll 317 retrieved from the roll datastore 319 (determined from the map information 312) with the substantially real-time roll to determine the roll 322. In one example, the roll compensation module 304 subtracts the chassis roll data 324 from the planned roll 317 to determine the roll 322. Thus, the roll 322 is the roll of the chassis 12 of the vehicle 10 at the current position of the vehicle 10. The roll compensation module 304 sets the roll 322 for the sensor control module 308. In one example, the roll compensation module 304 may set the roll 322 as a positive or negative rotation about the X-axis.

The sensor datastore 306 stores data indicating sensor characteristics 328 of the sensing devices 40a-40n. For each sensing device 40a-40n, the sensor characteristics 328 includes at least the vehicle coordinate locations of the field of view 41a-41n of each of the sensors 43a-43n associated with the respective sensing device 40a-40n. The sensor characteristics 328 may also include other constraints associated with each of the sensing devices 40a-40n, such as a beamwidth, limits to an amount of movement of each of the sensor platforms 45a-45n, movement rate limits for the actuators 49a-49n, slew rates for the actuators 49a-49n, etc. The sensor characteristics 328 in the sensor datastore 306 are predefined and may be factory-set. Alternatively, the sensor characteristics 328 may be predefined by a user of remote transportation system 52 and communicated to the vehicle 10.

The interest data datastore 307 stores pre-defined data indicating areas of interest 330 along the planned path of the vehicle 10. The areas of interest 330 include geographical or world coordinate locations for a pre-defined area of interest 47a-47n during the travel of the vehicle 10 along the planned path (e.g., a geographical coordinate location of an intersection, etc.). In various embodiments, the areas of interest 330 stored in the interest data datastore 307 are pre-defined (e.g., defined by a user of the remote transportation system 52 and communicated to the vehicle 10) and/or learned over time (e.g., learned based on repeated input from the one or more sensing devices 40a-40n, or other method of learning) by the vehicle 10 or other vehicles 10a-10n. Generally, each area of interest 330 comprises a geographical coordinate location for an alignment of each of the sensing devices 40a-40n during the travel of the vehicle 10 along the planned path to observe the respective area of interest 330. It should be understood, however, that the areas of interest 330 during the travel of the vehicle 10 may also be received from other modules of the vehicle 10 and/or from a user of the remote transportation system 52.

The sensor control module 308 receives as input the pitch 318 and the roll 322 determined for the current position of the vehicle 10. The sensor control module 308 also receives as input the position data 314, and based on the position data 314, retrieves the areas of interest 330 for the sensor platforms 45a-45n based on the current position of the vehicle 10. The sensor control module 308 retrieves the sensor characteristics 328 for each sensing device 40a-40n. The sensor control module 308 determines, for each sensing device 40a-40n, whether the field of view 41a-41n of the sensing device 40a-40n is aligned with the area of interest 47a-47n at the current position of the vehicle 10 based on the pitch 318 and the roll 322.

In this regard, in one example, the sensor control module 308 determines the vehicle coordinate location for the field of view 41a-41n of each sensing device 40a-40n based on the pitch 318 and the roll 322. Since the sensing devices 40a-40n are each rigidly coupled to the vehicle 10, as the chassis 12 is pitching and/or rolling, the sensing devices 40a-40n are also pitching and/or rolling. The sensor control module 308 updates or calculates the vehicle coordinate location for the field of view 41a-41n based on the pitch 318 and/or roll 322 by adding the Y-axis rotation value and/or the X-axis rotation value to the known vehicle coordinate locations of the field of view 41a-41n of the sensing devices 40a-40n.

With the areas of interest 330 retrieved from the interest data datastore 307, geometric calculations are employed that set the updated field of view 41a-41n of the respective sensing device 40a-40n equal to the respective geographical coordinate location of each of the areas of interest 330.

In the example of the area of interest 330 as a portion of a roadway, geometric calculations are performed to project the updated field of view 41a-41n of the respective sensing device 40a-40n onto the roadway. For example, if the sensing device 40a-40n has a pre-defined limited vertical beamwidth based on the sensor characteristics 328 and is mounted at some pre-defined height off the ground (on the vehicle 10 and based on the known location of the sensing devices 40a-40n), the sensor control module 308 calculates the geometric equation for the line (in a 2D vertical-forward plane), or more accurately a plane (in 3D space), of a top of the beam (from the pre-defined vertical beamwidth and known vehicle coordinate locations of the field of view 41a-41n) of the respective sensing device 40a-40n as a function of the pitch 318 and the roll 322. Stated another way, the sensor control module 308 updates the known coordinate locations for a top of the field of view 41a-41n based on the pitch 318 and the roll 322. The sensor control module 308 also calculates the geometric equation for the line (in a 2D vertical-forward plane), or more accurately a plane (in 3D space), of a bottom of the beam (from the pre-defined vertical beamwidth and known vehicle coordinate locations of the field of view 41a-41n) based on the pitch 318 and the roll 322. Stated another way, the sensor control module 308 updates the known coordinate locations for a bottom of the field of view 41a-41n based on the pitch 318 and the roll 322.

The intersections of these lines or planes with the roadway are solved for geometrically such that the field of view 41a-41n may be expressed mathematically as a function of an actuation angle or actuation angles of the respective sensing device 40a-40n. The area of interest 330 covered by the field of view 41a-41n of the sensing device 40a-40n is the area along the roadway that is in between the bottom of the beam intersection with the roadway, and the top of the beam intersection with the roadway. In other examples, the area of interest 330 retrieved from the interest data datastore 307 may also include height information (for example, to aim the sensing device 40a-40n at a vehicle bumper's approximate height at some position ahead on the roadway). In this example, the sensor control module 308 would employ the above-described projection method using a vertical offset above the roadway as opposed to the roadway itself.

In certain embodiments, the field of view 41a-41n may not be sufficient to fully cover the areas of interest 330, so an optimization procedure may be employed to maximize the coverage of the areas of interest 330 based on the geometric constraints of the sensing device 40a-40n retrieved in the sensor characteristics 328 for each sensing device 40a-40n. In the example of the roadway as the area of interest 330, the optimization procedure includes projecting the updated field of view 41a-41n of the respective sensing device 40a-40n onto the roadway (i.e. projecting the top of the beam of the respective sensing device 40a-40n and the bottom of the beam of the respective sensing device 40a-40n onto the roadway as a function of the pitch 318 and the roll 322). The intersections of these lines or planes with the roadway are solved for geometrically such that the field of view 41a-41n may be expressed mathematically as a function of an actuation angle or actuation angles of the respective sensing device 40a-40n. The optimization procedure performed by the sensor control module 308 solves for the desired actuation angle or actuation angles. Depending on the geometry of the roadway, the placement of the sensing device 40a-40n on the vehicle 10, the actuation limits of the sensing device 40a-40n, and the movable field of view 41a-41n associated with the respective sensing device 40a-40n (e.g., the vertical beamwidth of the respective sensing device 40a-40n), the area of interest 330 may not be able to be covered exactly, in which case the sensor control module 308 performs a numerical optimization procedure to attempt to maximize the area of interest 330 that is able to be covered. If all of the area of interest 330 may be covered, the optimization procedure may minimize the movement of the respective sensing device 40a-40n required to cover the area of interest 330, may attempt to orient the desired field of view 41a-41n of the sensing device 40a-40n as much towards the center of the field of view 41a-41n of the sensing device 40a-40n as possible, etc.

In other embodiments, dynamic limitations of the actuator 49a-49n (e.g. how fast the respective actuator 49a-49n may move the sensor 43a-43n based on the slew rate or rate limit associated with the respective actuator 49a-49n) retrieved in the sensor characteristics 328 may limit the ability of the field of view 41a-41n of the respective sensing device 40a-40n to track the respective area of interest 330. In this example, model predictive control may be used to maximize via mathematical optimization the predicted trajectory of the field of view 41a-41n of the sensing device 40a-40n relative to the area of interest 330 over time, based on the planned trajectory of the vehicle 10, planned movement of the vehicle 10 along the roadway, planned area of interest location, and known constraints of the actuators 49a-49n of the sensing devices 40a-40n. For example, if the sensing device 40a-40n has a relatively slow movement rate limit compared to the speed at which the attitude of the vehicle 10 and the road elevation ahead may change, the optimization procedure performed by the sensor control module 308 may also consider the instantaneous geometry of the situation along with these temporal constraints and information. Additionally, the model predictive control may take into account a model of the vehicle's chassis dynamics and the planned path in order to predict the roll and pitch of the vehicle 10 as it drives along the planned path to essentially predict the instantaneous roll and pitch of the vehicle 10 to construct a prediction of the adjusted roll and pitch.

The sensor control module 308 solves the geometric calculations that set the updated field of view 41a-41n of the respective sensing device 40a-40n equal to the respective geographical coordinate location of each of the areas of interest 330 to determine an amount of movement (actuation angle(s)) about the X-axis and the Y-axis to align the field of view 41a-41n of the sensor 43a-43n with the area of interest 330 and generates one or more control signals 332 to the respective actuators 49a-49n based on the solution. The sensor control module 308 may perform the above-described optimization procedure to determine the amount of movement about the X-axis and/or the Y-axis to align the field of view 41a-41n with the area of interest 330 and generate the one or more control signals 332 to the respective actuators 49a-49n based on the optimized solution. The one or more control signals 332 command the respective actuators 49a-49n to move the respective sensor platforms 45a-45n of the sensing devices 40a-40n about the X-axis and/or Y-axis such that the field of view 41a-41n of the sensor 43a-43n maintains alignment with the area of interest 330 at the current location of the vehicle 10.

Stated another way, generally, in various embodiments, the sensor control module 308 updates the known field of view 41a-41n of each of the sensing devices 40a-40n based on the pitch 318 and the roll 322. The sensor control module 308 sets the updated field of view 41a-41n equal to the known area of interest 330, as retrieved from the interest data datastore 307, and solves to determine the actuation angle(s) or amount of movement about the X-axis and the Y-axis to align the field of view 41a-41n with the area of interest 330. The sensor control module 308 generates the one or more control signals 332 based on this solution. In various embodiments, the sensor control module 308 may use one or more optimization procedures, which takes into account one or more sensor characteristics, one or more dynamic characteristics and the like as discussed above, to determine an optimized solution and the sensor control module 308 may generate the one or more control signals 332 based on the optimized solution.

Figure 5:
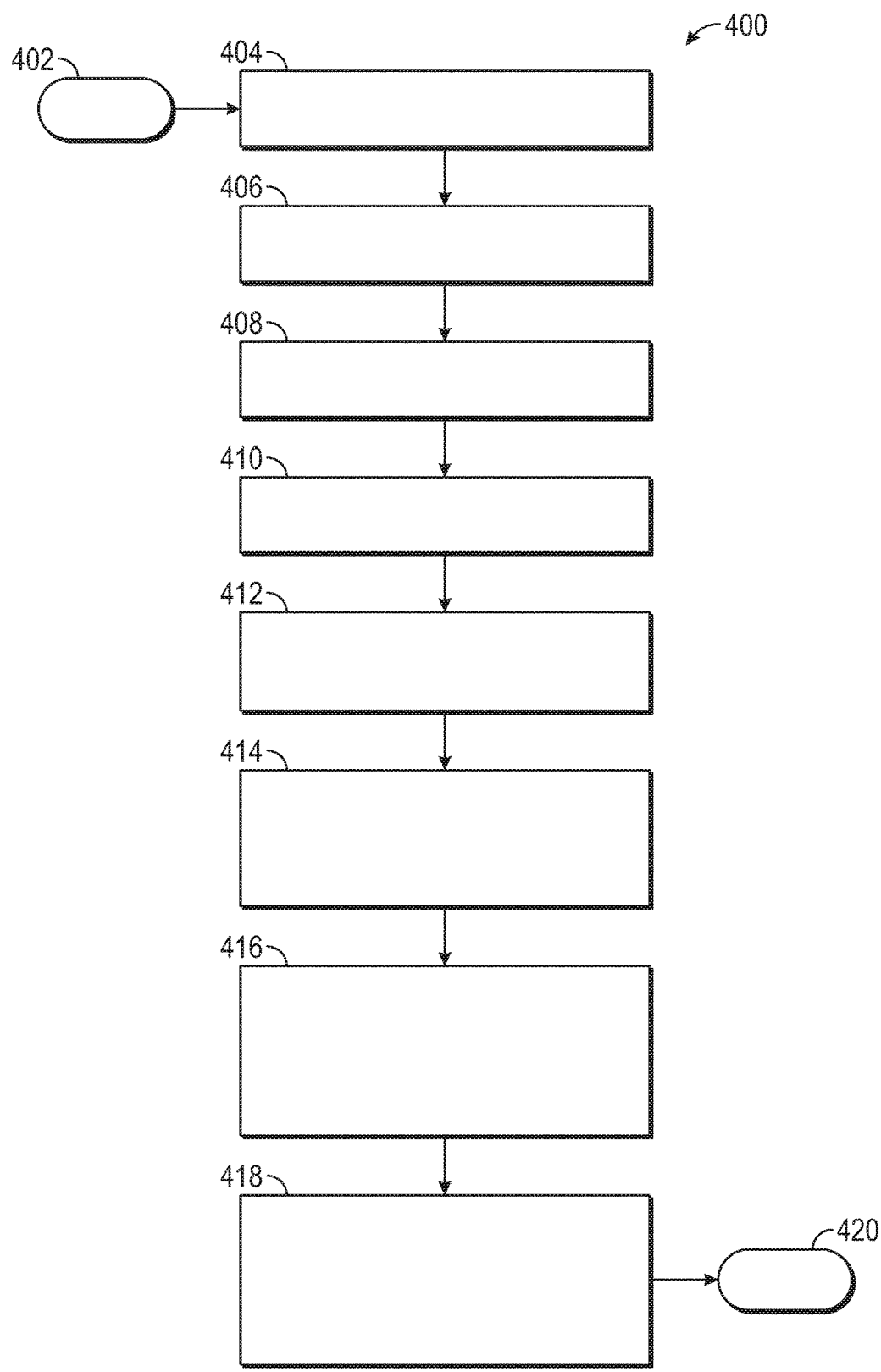
FIGS. 5-7 are flowcharts illustrating a control method for controlling a field of view of one or more sensing devices of the autonomous vehicle in accordance with various embodiments.

Referring now to FIG. 5, and with continued reference to FIGS. 1-4, a flowchart illustrates a control method 400 that can be performed by the sensing device field of view control system 100 of FIGS. 1-4 in accordance with the present disclosure. In one example, the control method 400 is performed by the processor 44 of the controller 34. As can be appreciated in light of the disclosure, the order of operation within the method is not limited to the sequential execution as illustrated in FIG. 5, but may be performed in one or more varying orders as applicable and in accordance with the present disclosure. In various embodiments, the control method 400 can be scheduled to run based on one or more predetermined events, and/or can run continuously during operation of the autonomous vehicle 10.

The method begins at 402. At 404, the method receives the pitch 318 for the current position of the vehicle 10, as will be discussed with regard to FIG. 6. At 406, the method receives the roll 322 for the current position of the vehicle 10, as will be discussed with regard to FIG. 7. At 408, the method retrieves the areas of interest 330 from the interest data datastore 307 based on the current position of the vehicle 10 from the position data 314. At 410, the method determines the vehicle coordinate locations for the fields of view 41a-41n of the sensing devices 40a-40n based on the pitch 318 and the roll 322. In one example, the method adds the Y-axis rotation value for the pitch 318 and/or the X-axis rotation value for the roll 322 to the known vehicle coordinate locations for the fields of view 41a-41n retrieved with the sensor characteristics 328 to update the vehicle coordinate locations of the fields of view 41a-41n based on the pitch 318 and the roll 322.

At 412, the method sets the updated fields of view 41a-41n of the sensing devices 40a-40n equal to the known geographical coordinate locations of the areas of interest 330. At 414, the method solves the geometric equations to determine the actuation angle(s) or an amount of movement about the X-axis and/or Y-axis to align the updated fields of view 41a-41n with the areas of interest 330. In various embodiments, the method performs the optimization procedure based on one or more of the sensor characteristics and the dynamic characteristics to determine an optimized solution. At 416, the method generates one or more control signals to the actuators 49a-49n of the sensing devices 40a-40n to move the sensor platform 45a-45n, and thus, the sensors 43a-43n, the determined amount about the X-axis and/or the Y-axis based on the solution. The method ends at 418.

Figure 6:
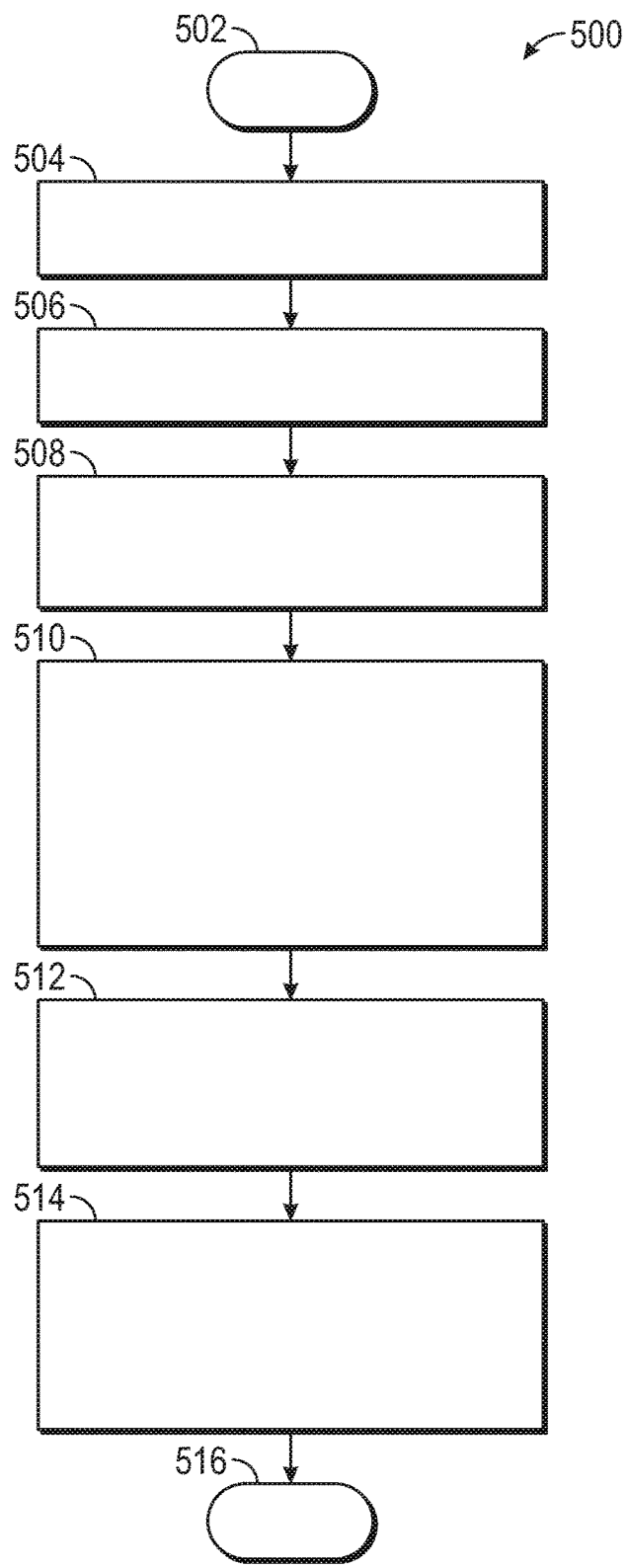

Referring now to FIG. 6, and with continued reference to FIGS. 1-4, a flowchart illustrates a control method 500 that can be performed by the sensing device field of view control system 100 of FIGS. 1-4 to determine a pitch of the chassis 12 of the vehicle 10 in accordance with the present disclosure. In one example, the control method 500 is performed by the processor 44 of the controller 34. As can be appreciated in light of the disclosure, the order of operation within the method is not limited to the sequential execution as illustrated in FIG. 6, but may be performed in one or more varying orders as applicable and in accordance with the present disclosure. In various embodiments, the control method 500 can be scheduled to run based on one or more predetermined events, and/or can run continuously during operation of the autonomous vehicle 10.

The method begins at 502. At 504, the method receives the current position of the vehicle 10 (from the position data 314) and receives the determined path for the vehicle 10 (from the path data 316). At 506, the method retrieves the map information 310 from the map datastore 300, which comprises the known roadway pitch and/or incline at the current position of the vehicle 10 and for the longitudinal prediction horizon. At 508, based on the map information 310 (or other sources), the method determines the planned pitch 311 of the vehicle 10 at the current position of the vehicle 10 and for the longitudinal prediction horizon.

At 510, the method performs a coordinate transformation to transform the geographical coordinate value of the planned pitch 311 into a vehicle coordinate value for the current position of the vehicle 10 and for the positions of the vehicle 10 within the longitudinal prediction horizon. The method stores the planned pitch 311 associated with the current position of the vehicle 10 and the planned pitch 311 for the coordinate locations associated with the longitudinal prediction horizon in the pitch datastore 313. At 512, the method receives and processes the chassis pitch data 320 to determine the substantially real-time pitch of the chassis 12 of the vehicle 10. At 514, based on the current position of the vehicle 10 (from the position data 314), the method queries the pitch datastore 313 and retrieves the planned pitch 311 associated with the current position of the vehicle 10. The method determines the pitch 318 based on the planned pitch 311 and the substantially real-time pitch. In one example, the method subtracts the real-time pitch from the planned pitch. The method ends at 516.

Figure 7:
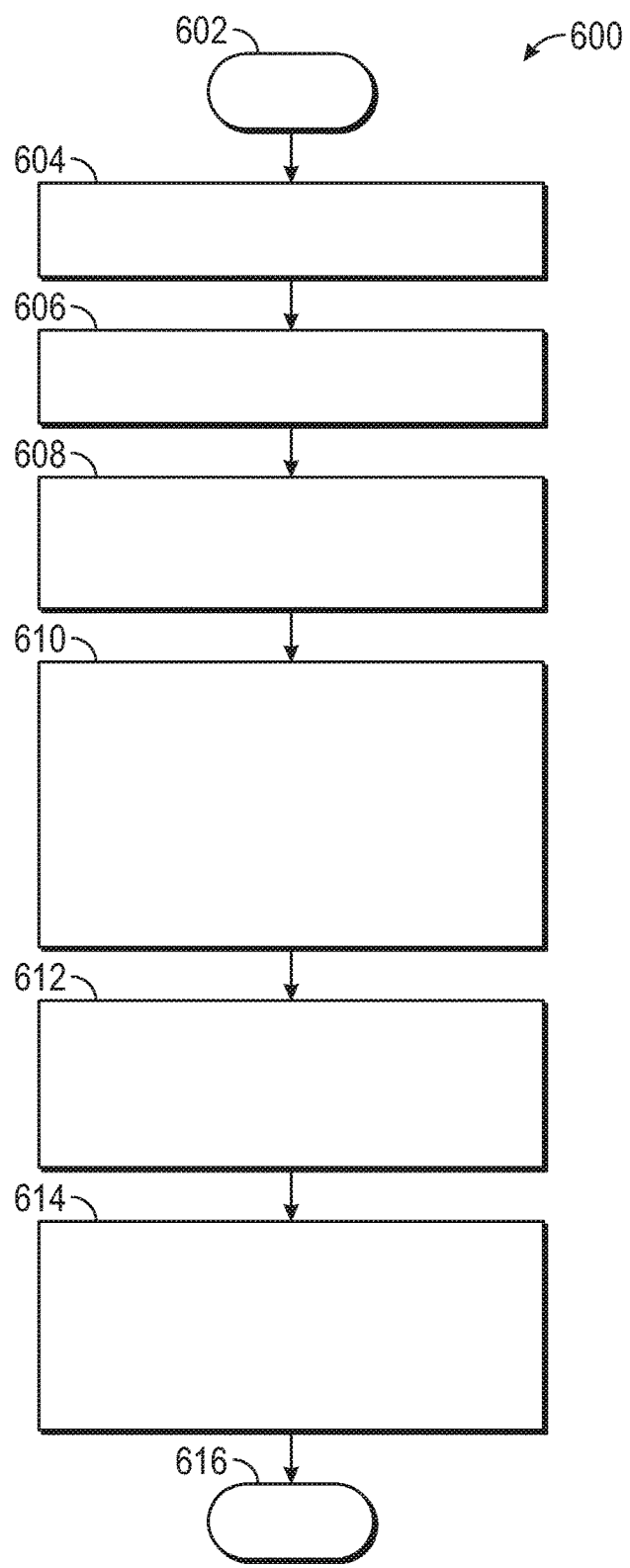

Referring now to FIG. 7, and with continued reference to FIGS. 1-4, a flowchart illustrates a control method 600 that can be performed by the sensing device field of view control system 100 of FIGS. 1-4 to determine a roll of the chassis 12 of the vehicle 10 in accordance with the present disclosure. In one example, the control method 600 is performed by the processor 44 of the controller 34. As can be appreciated in light of the disclosure, the order of operation within the method is not limited to the sequential execution as illustrated in FIG. 7, but may be performed in one or more varying orders as applicable and in accordance with the present disclosure. In various embodiments, the control method 600 can be scheduled to run based on one or more predetermined events, and/or can run continuously during operation of the autonomous vehicle 10.

The method begins at 602. At 604, the method receives the current position of the vehicle 10 (from the position data 314) and receives the determined path for the vehicle 10 (from the path data 316). At 606, the method retrieves the map information 312 from the map datastore 300, which comprises the known roadway curvature for the current position of the vehicle 10, along with the known curvature along the determined path of the vehicle 10. At 608, based on the map information 312 (or other sources), the method determines the planned roll 317 of the vehicle 10 at the current position of the vehicle 10 and for the lateral prediction horizon.

At 610, the method performs a coordinate transformation to transform the geographical coordinate value of the planned roll 317 into a vehicle coordinate value for the current position of the vehicle 10 and for the positions of the vehicle 10 within the lateral prediction horizon. The method stores the planned roll 317 associated with the current position of the vehicle 10 and the planned roll 317 for the coordinate locations associated with the lateral prediction horizon in the roll datastore 319. At 612, method receives and processes the chassis roll data 324 to determine the substantially real-time roll of the chassis 12 of the vehicle 10. At 614, based on the current position of the vehicle 10 (from the position data 314), the method queries the roll datastore 319 and retrieves the planned roll 317 associated with the current position of the vehicle 10. The method determines the roll 322 based on the planned roll 317 and the substantially real-time roll. In one example, the method subtracts the real-time roll from the planned roll. The method ends at 616.

Thus, the sensing device field of view control system 100 controls a position of the sensing devices 40a-40n to maintain the field of view 41a-41n of the sensing devices 40a-40n aligned with the predefined areas of interest 330. By controlling the position of the sensors 43a-43n of the sensing devices 40a-40n based on the pitch and the roll of the vehicle 10, both planned and unplanned (i.e. as observed by the sensing devices 40a-40n), the sensing device field of view control system 100 ensures that the field of view 41a-41n maintains alignment with the areas of interest 330. For example, if the vehicle 10 is traveling down a substantially straight roadway, and the field of view of a sensing device is orientated in a direction substantially parallel to the direction of travel, based on a planned pitch of the vehicle 10 at or near the current location as increasing in the Y-direction, the sensing device field of view control system 100 moves the sensing device about the Y-axis downward based on the motion of the chassis 12.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a field of view of a sensing device of an autonomous vehicle, comprising:
   receiving a current position of the autonomous vehicle along a determined path;
   retrieving map information that includes a pitch and a curvature of a roadway at or near the current position;
   determining, by a processor, based on the map information, a planned pitch of the autonomous vehicle at or near the current position;
   determining, by the processor, based on the map information, a planned roll of the autonomous vehicle at or near the current position;
   determining, by the processor, based on the planned pitch and the planned roll of the autonomous vehicle, a location of the field of view of the sensing device;
   determining, based on the location of the field of view and a location of an area of interest at the current position, an amount of movement of the sensing device to align the field of view with the area of interest; and
   generating, by the processor, one or more control signals to one or more actuators associated with the sensing device to move the sensing device to align the field of view based on the determined amount of movement.

2. The method of claim 1, further comprising:
   calculating, by the processor, based on the planned roll of the autonomous vehicle, an amount of movement about a first axis to align the field of view of the sensing device with the area of interest at the current position.

3. The method of claim 2, further comprising:
   calculating, by the processor, based on the planned pitch of the autonomous vehicle, an amount of movement about a second axis to align the field of view of the sensing device with the area of interest at the current position.

4. The method of claim 3, wherein the generating the one or more control signals to the one or more actuators associated with the sensing device further comprises:
   retrieving, by the processor, a geographical coordinate location for the area of interest associated with the current position of the autonomous vehicle from a datastore;
   retrieving, by the processor, a vehicle coordinate location for the field of view of the sensing device;
   updating, by the processor, the vehicle coordinate location for the field of view based on the planned pitch and planned roll of the autonomous vehicle;
   determining, by the processor, based on the updated vehicle coordinate location for the field of view and the geographical coordinate location for the area of interest, an amount of movement about the first axis and the second axis to align the field of view with the area of interest; and
   generating, by the processor, the one or more control signals based on the determining.

5. The method of claim 1, further comprising:
   receiving, by the processor, sensor signals that provide a substantially real-time roll of a chassis of the autonomous vehicle at the current location of the autonomous vehicle; and
   determining, by the processor, a roll of the autonomous vehicle based on the planned roll at the current location and the substantially real-time roll of the chassis.

6. The method of claim 5, wherein the determining the roll of the autonomous vehicle further comprises:
transforming, by the processor, the planned roll into a vehicular coordinate system; and
subtracting, by the processor, the substantially real-time roll of the chassis from the planned roll.

7. The method of claim 1, further comprising:
receiving, by the processor, sensor signals that provide a substantially real-time pitch of a chassis of the autonomous vehicle at the current location of the autonomous vehicle; and
determining, by the processor, a pitch of the autonomous vehicle based on the planned pitch and the substantially real-time pitch of the chassis.

8. The method of claim 7, wherein the determining the pitch of the autonomous vehicle further comprises:
transforming, by the processor, the planned pitch into a vehicular coordinate system; and
subtracting, by the processor, the substantially real-time pitch of the chassis from the planned pitch.

9. A system for controlling a field of view of a sensing device of an autonomous vehicle, comprising:
a source of a current position of the autonomous vehicle along a determined path;
a source of map information that includes a pitch and a curvature of a roadway at or near the current position;
the sensing device having the field of view, and the field of view of the sensing device movable by one or more actuators associated with the sensing device;
a controller, having a processor, that is configured to:
determine, based on the map information, a planned pitch of the autonomous vehicle at or near the current position;
determine, based on the map information, a planned roll of the autonomous vehicle at or near the current position;
determine, based on the planned pitch and the planned roll of the autonomous vehicle, a location of the field of view of the sensing device;
determine, based on the location of the field of view and a location of an area of interest at the current position, an amount of movement of the sensing device to align the field of view with the area of interest; and
generate one or more control signals to the one or more actuators associated with the sensing device to move the sensing device to align the field of view based on the determined amount of movement.

10. The system of claim 9, wherein the controller is configured to calculate, based on the planned roll of the autonomous vehicle, an amount of movement about a first axis to align the field of view of the sensing device with the area of interest at or near the current position.

11. The system of claim 10, wherein the controller is configured to calculate, based on the planned pitch of the autonomous vehicle, an amount of movement about a second axis to align the field of view of the sensing device with the area of interest at or near the current position.

12. The system of claim 11, wherein the controller is configured to generate the one or more control signals to the one or more actuators associated with the sensing device based on a geographical coordinate location for the area of interest associated with the current position of the autonomous vehicle that is retrieved from a datastore and a vehicle coordinate location for the field of view of the sensing device that is retrieved from a second datastore, the controller configured to update the vehicle coordinate location for the field of view based on the planned pitch and planned roll of the autonomous vehicle, to determine, based on the updated vehicle coordinate location for the field of view and the geographical coordinate location for the area of interest, an amount of movement about the first axis and the second axis to align the field of view with the area of interest, and to generate the one or more control signals based on the determination of the amount of movement.

13. The system of claim 9, wherein the controller is configured to receive sensor signals that provide a substantially real-time roll of a chassis of the autonomous vehicle at the current location of the autonomous vehicle, and to determine a roll of the autonomous vehicle based on the planned roll at the current location and the substantially real-time roll of the chassis.

14. The system of claim 13, wherein the controller is configured to determine the roll of the autonomous vehicle based on a transformation of the planned roll into a vehicular coordinate system, and the controller is configured to subtract the substantially real-time roll of the chassis from the planned roll.

15. The system of claim 9, wherein the controller is configured to receive sensor signals that provide a substantially real-time pitch of a chassis of the autonomous vehicle at the current location of the autonomous vehicle, and to determine a pitch of the autonomous vehicle based on the planned pitch and the substantially real-time pitch of the chassis.

16. The system of claim 15, wherein the controller is configured to determine the pitch of the autonomous vehicle based on a transformation of the planned pitch into a vehicular coordinate system, and the controller is configured to subtract the substantially real-time pitch of the chassis from the planned pitch.

17. An autonomous vehicle, comprising:
a source of a current position of the autonomous vehicle along a determined path;
a source of map information that includes a pitch and a curvature of a roadway at or near the current position;
a sensing device having a field of view, and the field of view of the sensing device movable by one or more actuators associated with the sensing device;
a controller, having a processor, that is configured to:
determine based on the map information, a planned pitch of the autonomous vehicle at or near the current position;
determine based on the map information, a planned roll of the autonomous vehicle at or near the current position;
receive sensor signals that provide a substantially real-time pitch of a chassis of the autonomous vehicle at the current location of the autonomous vehicle;
determine a pitch of the autonomous vehicle at the current position based on the planned pitch and the substantially real-time pitch;
determine, based on the pitch and the planned roll of the autonomous vehicle, a location of the field of view of the sensing device;
determine, based on the location of the field of view and a location of an area of interest at the current position, an amount of movement of the sensing device to align the field of view with the area of interest; and
generate one or more control signals to the one or more actuators associated with the sensing device to move the sensing device to align the field of view based on the determined amount of movement.

18. The autonomous vehicle of claim 17, wherein the controller is configured to receive sensor signals that provide a substantially real-time roll of a chassis of the autonomous vehicle at the current location of the autonomous vehicle, to determine a roll of the autonomous vehicle at the current position based on the planned roll and the substantially real-time roll, and to determine the location of the field of view of the sensing device based on the pitch and the roll of the autonomous vehicle.

19. The autonomous vehicle of claim 18, wherein the controller is configured to determine the roll of the autonomous vehicle based on a transformation of the planned roll into a vehicular coordinate system, and the controller is configured to subtract the substantially real-time roll of the chassis from the planned roll.

20. The autonomous vehicle of claim 17, wherein the controller is configured to determine the pitch of the autonomous vehicle based on a transformation of the planned pitch into a vehicular coordinate system, and the controller is configured to subtract the substantially real-time pitch of the chassis from the planned pitch.

\* \* \* \* \*